(12) United States Patent
Kyan et al.

(10) Patent No.: US 9,986,133 B2
(45) Date of Patent: May 29, 2018

(54) METHOD AND SYSTEM FOR COLOR GAMUT EXPANSION IN PRINT

(71) Applicants: Matthew James Kyan, Toronto (CA); Nawar Badie Fdhal Mahfooth, Oakville (CA); Mordechai Mark Sibilia, Toronto (CA)

(72) Inventors: Matthew James Kyan, Toronto (CA); Nawar Badie Fdhal Mahfooth, Oakville (CA); Mordechai Mark Sibilia, Toronto (CA)

( * ) Notice: Subject to any disclaimer, the term of this patent is extended or adjusted under 35 U.S.C. 154(b) by 0 days. days.

(21) Appl. No.: 15/324,433

(22) PCT Filed: Jul. 6, 2015

(86) PCT No.: PCT/CA2015/050624
§ 371 (c)(1),
(2) Date: Jan. 6, 2017

(87) PCT Pub. No.: WO2016/004524
PCT Pub. Date: Jan. 14, 2016

(65) Prior Publication Data
US 2017/0201653 A1    Jul. 13, 2017

Related U.S. Application Data

(60) Provisional application No. 62/021,151, filed on Jul. 6, 2014.

(51) Int. Cl.
| | | |
|---|---|---|
| *H04N 1/00* | (2006.01) | |
| *G06K 15/02* | (2006.01) | |
| *H04N 1/54* | (2006.01) | |
| *H04N 1/60* | (2006.01) | |

(52) U.S. Cl.
CPC ........... *H04N 1/6027* (2013.01); *G06K 15/02* (2013.01); *H04N 1/54* (2013.01); *H04N 1/6072* (2013.01)

(58) Field of Classification Search
None
See application file for complete search history.

(56) References Cited

U.S. PATENT DOCUMENTS

| | | | |
|---|---|---|---|
| 5,892,891 A | 4/1999 | Dalal et al. | |
| 2013/0113383 A1* | 5/2013 | Fdhal | H05B 37/02 315/152 |

FOREIGN PATENT DOCUMENTS

WO    2014011995 A1    1/2014

OTHER PUBLICATIONS

Patent Cooperation Treaty, International Search Report and Written Opinion dated Sep. 22, 2015, in International Application No. PCT/CA2015/050624.

(Continued)

*Primary Examiner* — Thomas D Lee
(74) *Attorney, Agent, or Firm* — Norton Rose Fulbright Canada LLP

(57) ABSTRACT

In certain aspects, the present disclosure relates to systems, methods, and devices for expanding a printing color gamut such as CMYK for printing or in preparation for printing on printing devices. In certain aspects, the disclosure relates to systems, methods and devices for optimizing or improving multicolor process print manufacturing, in particular, through automated and adaptive selection of additional colorants using color-perception based analysis of embedded visual content.

16 Claims, 11 Drawing Sheets

(56) References Cited

OTHER PUBLICATIONS

Jang, In-Su et al., "Hi-Fi Printer Characterization Method Using Color Correlation for Gamut Extension", Image Processing, 2006, IEEE International Conference on IEEE 2006.

* cited by examiner

10

METHOD AND SYSTEM FOR COLOR GAMUT EXPANSION IN PRINT

CROSS-REFERENCE TO RELATED APPLICATIONS

This application is a national phase application under 35 U.S.C. 371 of International Patent Application No. PCT/CA2015/050624 filed on Jul. 6, 2015, and claims all benefit, including priority, of U.S. provisional patent application Ser. No. 62/021,151, filed Jul. 6, 2014, and entitled "METHOD AND SYSTEM FOR ADAPTIVE, PERCEPTION-BASED COLOR GAMUT EXPANSION IN PRINT," the entire contents of which are herein incorporated by this reference.

FIELD

Embodiments of the present disclosure relate generally to the field of multicolor print processes. In particular, embodiments of the disclosure relate to methods, systems and devices for color gamut expansion.

BACKGROUND

Multi-color "hi-fi" printing refers to the use of "house" or "spot" inks (colorants) in addition to the four standard CMYK printing colorants (Cyan, Magenta, Yellow and Black), and is commonly applied in flexo, sheet-fed offset, digital and other print processes in order to extend the color gamut that can be reproduced during the manufacturing process. When printing jobs include a significant amount of photographic content, such as in the reproduction of artwork, packaging or any job where significant color content resides outside of the CMYK gamut, the final printed result is often "flat" or less vivid as compared to the gamut in which graphic assets were originally constructed or captured (e.g. Adobe RGB). In order to compensate or boost color quality and vividness across the embedded artwork, additional colorants are applied through separate channels over and above CMYK.

SUMMARY

In certain aspects, the present disclosure relates to systems, methods, and devices for expanding a printing color gamut such as CMYK for printing or in preparation for printing on printing devices. In certain aspects, the disclosure relates to systems, methods and devices for optimizing or improving multicolor process print manufacturing, in particular, through automated and adaptive selection of additional colorants using color-perception based analysis of embedded visual content.

In accordance with an aspect of the present disclosure, there is provided a method for expanding an initial printing color gamut. The method includes receiving, at at least one processor, a digital asset to be prepared for printing; storing the digital asset in a first memory location; generating, with the at least one processor, a perceived-color sensitivity mapping for the digital asset; storing the perceived-color sensitivity mapping in a second memory location; based on the perceived-color sensitivity mapping for the pixels outside the initial printing color gamut, selecting one or more free colorants to create an expanded color gamut; converting, the digital asset into a digital proof using the expanded color gamut; and generating instructions for printing or displaying the digital proof.

In accordance with another aspect of the present disclosure, there is provided a method for identifying images to be printed from a repository of images. The method includes: receiving, at at least one processor, a selection of colorants; for each image in the repository of images: generating, with the at least one processor, a perceived-color sensitivity mapping for the image, and generating, an improvement score for the image based on the perceived-color sensitivity mapping and the selection of colorants; and ranking the images in the repository based on their improvement score.

In accordance with another aspect of the present disclosure, there is provided a device including: at least one memory; and at least one processor. The at least one processor is configured to receiving, at at least one processor, a digital asset to be prepared for printing; storing the digital asset in a first memory location; generating, with the at least one processor, a perceived-color sensitivity mapping for the digital asset; storing the perceived-color sensitivity mapping in a second memory location; based on the perceived-color sensitivity mapping for the pixels outside the initial printing color gamut, selecting one or more free colorants to create an expanded color gamut; converting, the digital asset into a digital proof using the expanded color gamut; and generating instructions for printing or displaying the digital proof.

Many further features and combinations thereof concerning embodiments described herein will appear to those skilled in the art following a reading of the instant disclosure.

DESCRIPTION OF THE DRAWINGS

In accordance with example embodiments.

DESCRIPTION OF SELECT REFERENCE NUMERALS

Figure 1:
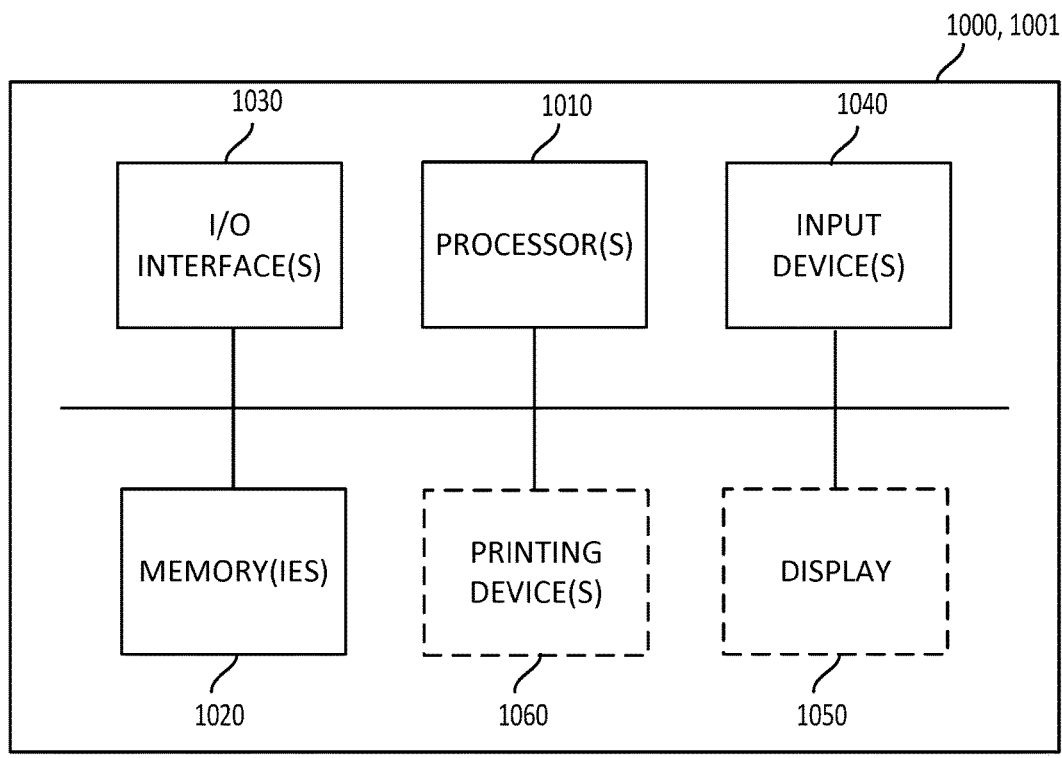
FIG. 1 is a schematic showing aspects of example systems and devices in accordance with example embodiments.

10—Original RGB image
12—Areas in 10 that are out-of-gamut with respect to the process CMYK colorants
14—Areas in 10 that are inside the gamut with respect to the process CMYK colorants
16—CMYK gamut boundary in the Lab color space 18—Pixel colors that fall inside the CMYK gamut (corresponding to 14)

20—Pixels of the sample image that are out-of-gamut w.r.t. CMYK (corresponding to 12), in the green region of the Lab color space (green light bulb)

22—Pixels of the sample image that out-of-gamut w.r.t. CMYK (corresponding to 12), in the blue/violet region of the Lab color space (blue sweater and purple background)

24—Pixels of the sample image that out-of-gamut w.r.t. CMYK (corresponding to 12), in the red/orange region of the Lab color space (red shirt)

28—One of the colorants to add to expand the CMYK. In this example, this is Orange 021

30—Free colorant candidates from which the system will automatically select.

32—Secondary (spot) colors that may be reproducible using selected colorants.

34—Fixed colorant(s) (e.g. C, M, Y, or K)

25—Pixels or areas in 10 to which an observer may be more sensitive in terms of color-perception 27—Pixels or areas in 10 to which an observer may be less sensitive in terms of color-perception than in 25, but more sensitive to than pixels or areas in 29

29—Pixels or areas in 10 that have relatively low sensitivity in terms of color perception compared to the pixels or areas in 25 and 27

40—free colorant candidate in the green out-of-gamut region of 10

42—free colorant candidate in the red/orange out-of-gamut region of 10

44—free colorant candidate in the blue/purple out-of-gamut region of 10

DETAILED DESCRIPTION

The use of additional colorants in conjunction with typically considered base (e.g. CMYK) process inks, involves addition of a fixed set of specialized inks (e.g. Hexachrome or Opaltone), the mixture of which provides coverage in regions of the CMYK gamut that would normally be deficient; or the addition of a set of isolated inks (e.g. Pantone® PMS®) that are matched (within acceptable tolerances) to specific embedded colors, such as trademark or branded colors.

In some situations, the job may be printed with an expanded gamut if explicitly specified as a multi-channel separation within the job file. This is usually done by specifying more than 4 color channels, e.g. 5 or in some cases, or up to 7, such that the full potential of modern color presses can be leveraged; or by embedding a set of individual spot color specifications (one per channel) that relate to regions to be printed in isolation from the main content (which is printed with the mixture of CMYK). In some manufacturing processes (e.g. offset), the embedded color information in the file is used to then generate touch plates for each unique colorant to be used in the printing process, which physically control the location and degree to which each colorant will be applied to the substrate during printing.

The specification of appropriate colorants that could effectively extend the gamut beyond that of CMYK on a particular job is generally considered through manual or subjective user selection and separation conducted in the design phase (when a job is initially constructed), or the pre-press phase (prior to print manufacturing). Moreover, the selection of additional color channels is difficult to color-manage due to a lack of tools that can accurately proof results for multi-color solutions. While the use of specialized fixed colorants (e.g. Toyo, Opaltone) can provide for a global improvement in the gamut of colors that can be reproduced, individual jobs can benefit from a more targeted approach.

One major limitation in extending the color gamut of printed jobs is that there is no clear method for automatically specifying an optimal set of colorants that would maximize the color gamut of the overall job (with respect to the gamut in which original image assets were acquired/constructed). In addition, if a job has pre-specified constraints (i.e. has embedded particular spot or branded colors), there is currently no optimal way to select non-standard colorants to be used in conjunction with standard colorants so as to maximize the overall color gamut of the printed job as measured in a device independent color space. Moreover, there are a number of ways in which the gamut can potentially be extended, although there remain limitations in the number of additional channels (and associated colorants) that can be employed practically (if trying to limit the number of press runs to complete a job). In light of such constraints, there currently exists no method for automatic colorant selection that attempts to adapt and maximize the visual impact of color in a job-specific manner, particularly in regions where it may be most readily perceived.

One advantage which in some instances may be provided by some aspects of the present disclosure is the automation of the selection of colorants to be used on press for maximizing or expanding the reproducible color gamut particular to some or all digital (e.g. graphic) assets embedded, for example, into a set of print job(s), which may consist of one or more sets of imagery.

In some examples, the maximization or expansion may be performed in a way that prioritizes the enhancement of perceived color-contrast in the image. These examples may employ a novel color perceptual-sensitivity mapping to identify localized regions that exhibit strong color-contrast with respect to surrounding content, which may be thereby used to modulate the importance of colors considered key to a vivid reproduction. In this way, embodiments of the present disclosure may identify colorants that extend gamut only where required, such that perceived visual fidelity may be enhanced across defined graphic assets with one combined process. In some embodiments, the method may be applicable to pre-press operations for facilitating colorant decisions and associated separations when converting source files into press ready format.

Although terms such as "maximize", "minimize" and "optimize" may be used in the present disclosure, it should be understood that such terms may be used to refer to improvements, tuning and refinements which may not be strictly limited to maximal, minimal or optimal.

FIG. 1 shows a schematic diagram of an example system 1000 or example device(s) 1001 for expanding an initial printing color gamut. In some embodiments, the system(s) 1000 or device(s) 1001 may include one or more processor(s) 1010, memory(ies) 1020, input/output interface(s) 1030, input device(s) 1040, display(s) 1050, printing device(s) or mechanism(s) 1060, and/or any other devices or mechanisms suitable for performing aspects of the methods and functions described herein.

In some embodiments, the system 1000 may include one or more device(s) 1001 or system(s) which provide the mechanisms, controls, devices and/or communication link(s) to perform aspects of the methods and functions described herein. For example, the system 1000 may include one or more computers, servers and control devices configured for preprocessing digital assets for printing and for instructing or otherwise communicating with one or more printing device(s) or mechanisms 1060. In some embodiments, an example device 1001 may be a standalone computer, server, mobile device (tablet, smartphone, etc.) or other computing device configured for preprocessing or otherwise converting a digital asset for printing with an expanded color gamut on a networked or external printing device 1001 or system 1000.

In some embodiments, an example device 1001 may be a printing device which can be configured to preprocess or otherwise convert a digital asset for printing with an expanded color gamut. For example, some or all of the example components in FIG. 1 may be found on a single printing system 1000 or printing device 1001. Examples of such systems 1000 or devices 1001 may include various presses (e.g. offset, flexo, digital presses) or other printers or printing devices having options for colorant selection during the printing process. In some examples, the systems 1000 or devices 1001 may include a 3D printer or additive manufacturing device with colorants or different colored materials.

Each processor 1010 may be, for example, any type of general-purpose microprocessor or microcontroller, a central or graphics processing unit, a digital signal processing (DSP) processor, an integrated circuit, a field programmable gate array (FPGA), a reconfigurable processor, a programmable read-only memory (PROM), or any combination thereof.

Memory device(s) 1020 may include one or a combination of any type of computer memory that is location either internally or externally (e.g. networked or peripheral) such as, for example, hard drives, flash memory, solid state memory, network storage devices, random-access memory (RAM), cache memory, read-only memory (ROM), Blu-ray® or compact disc read-only memory (CDROM), electro-optical memory, magneto-optical memory, erasable programmable read-only memory (EPROM), and electrically-erasable programmable read-only memory (EEPROM), Ferroelectric RAM (FRAM), non-transitory computer readable media or the like.

In some examples, memory device(s) 1020 may include digital assets such as images, documents, print jobs, 3D models, schematics, or any other data which can represent an asset to be printed. These digital assets may be in any standard or proprietary format which is suitable for being processed for printing, or can be converted into a format suitable for being processed for printing.

In some examples, memory device(s) 1020 may include data or instruction sets for controlling or instructing printing device(s) 1001, 1060 such as such as drivers, firmware, software, etc.; as well as information associating with printing device(s) 1001, 1060 such as default colorants and color gamuts, available colorants, maximum number of colorants that can be used, etc.

The memory device(s) 1020 may also include instructions or code for configuring one or more processor(s) and other components of the device 1001, system 1000 to perform any of the methods and functions described herein.

Some input/output (I/O) interface(s) 1030 can enable a device 1001 or system 1000 to interconnect with one or more input devices, such as a keyboard, mouse, camera, touch screen and a microphone, or with one or more output devices such as a display screen and a speaker. In some embodiments, I/O interface(s) 1030 can also include network interfaces which enable devices 1001 or aspects of the system 1000 to communicate with other components, to exchange data with other components, to access and connect to network resources, to serve applications, and perform other computing applications by connecting to one or more wired or wireless networks capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, Bluetooth ®, near field communication (NFC), fixed line, local area network, wide area network, and others, including any combination of these.

In some examples, one or more I/O interfaces 1030 may enable a device 1001 or system 1000 to communicate, instruct, control, or otherwise interconnect with a printing device or system.

In some embodiments, device(s) 1000 and/or system(s) 1001 may include input device(s) such as keyboard, mouse, camera, touch screen, microphone, etc. For example, a computing device or printing device may include a keypad, touchscreen, or other integrated, peripheral or linked input device. For example, a device 1000 may include one or more devices for receiving input for receiving an input identifying or selecting digital assets, selected colorants, select portions of digital assets, etc.

Device(s) 1000 and/or system(s) 1001 may include one or more displays 1050. The display(s) 1050 may be integrated, peripheral or otherwise linked to one or more device(s). For example, a display 1050 may be a display on or connected to a computing device for displaying a digital asset, a perceived-color sensitivity mapping, a color gamut, a digital proof (e.g. a proof or sample of how a digital asset may appear when printed with a certain color gamut), etc.

System(s) 1001 or device(s) 1000 may include one or more printing device(s) 1060. In some examples, the printing device(s) may be integrated, external or otherwise connected printing device(s) 1060 for printing digital assets. In some examples, the printing device(s) 1060 may be components of a larger printing device or system which may be instructed by or may provide information to the processor(s) 1010. In some embodiments, the printing device(s) 1060 may be configured to communicate information to the processor(s) 1010 such as, for example, default colorants or color gamuts, available colorants, maximum number of colorants that can be used, etc.

The discussion herein provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected", "linked" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a Blu-ray® disk, compact disk read-only memory (CD-ROM), a USB flash disk, an internal or removable hard disk, or any other suitable memory device. The software product includes a number of instructions that enable a computer device (computer, server, mobile device or printing device) to execute the methods provided by the embodiments.

In accordance with embodiments of the present disclosure, the system(s) and device(s) described herein may be configured to generate a perceived-color sensitivity mapping and determine a colorant selection for a digital asset. In some embodiments, one or more of the processes described herein may provide an optimal colorant selection based on the perceived-color sensitivity mapping generated for the particular digital asset. In some embodiments, the optimal colorant selection may be also based on one or more optional constraints that specify: (i) a subset of the colorants to be fixed (e.g. standard CMY or CMYK process colorants); (ii) the number of free colorants (to be automatically selected); (iii) the set of colorants to select from (e.g. Pantone PMS primaries); (iv) a spatially localized region/set of sub-regions within the imagery over which to optimize colorant selection; (v) specified spot colors, or (vi) any combination of (i)-(v).

In (iv), example methods may automatically identify regions in the image where sensitivity to color-contrast is most pronounced, while some example methods may also permit input(s) to optionally and interactively refine/adjust importance regions, to re-target which areas of the content will influence colorant selection.

Figure 2:
FIG. 2 is a sample of an original RGB image.
Figure 3:
FIG. 3 is as image corresponding to the image in FIG. 2 showing colors that are in-gamut and out-of-gamut.

Given a digital asset (e.g. a print job RGB asset) (FIG. 2) that includes photographic content 10, there are often cases where the original color gamut captured during acquisition (e.g. Adobe RGB), falls outside the gamut reproducible using the standard set of process colorants (e.g. CMYK) used to create the printed result. For instance, as shown in (FIG. 3), the pixels from 10, either fall outside of the CMYK gamut 12 and cannot be reproduced accurately, or fall within the CMYK gamut 14 and can be reproduced accurately using only the fixed CMYK colorants.

Pixels that fall outside of the reproducible gamut (out-of-gamut pixels), may be re-mapped onto their closest representation at the CMYK gamut boundary 16, resulting in gamut compression over the effected regions. The resulting gamut compression can yield a flattened or less-vivid representation in the printed result as compared to the original.

Figure 4:
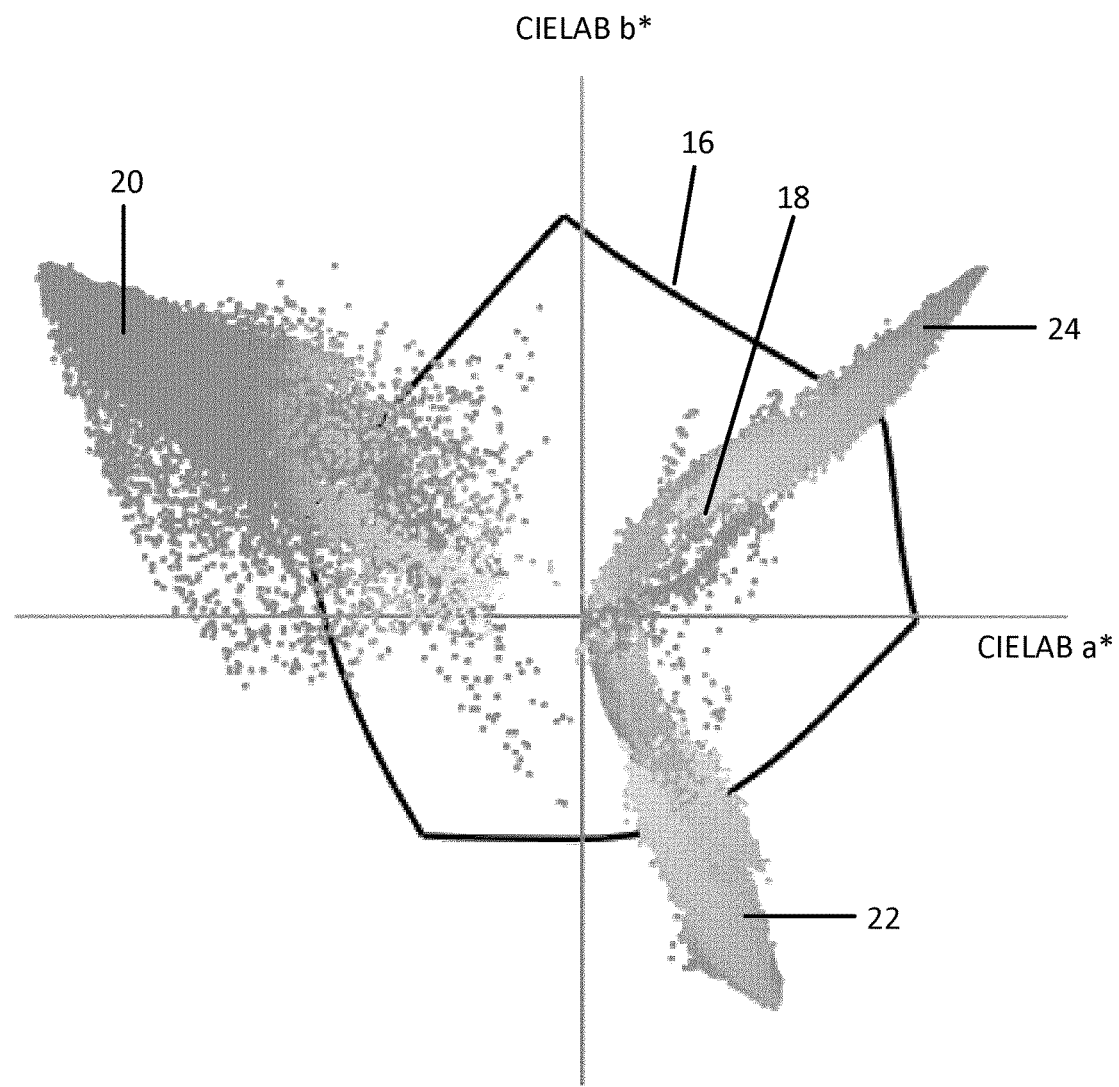
FIG. 4 is a 2D CIELAB (Lab) color space showing CMYK gamut and out of gamut pixels for original RGB image shown in FIG. 2.

The gamut can be represented in a device independent color space (e.g. CIELAB), and is depicted (FIG. 4) in 2D form, where pixels from 10 are projected onto the chroma channels (CIELAB a*, and CIELAB b*) of the CIELAB color-space. Individual pixels from the image 10, when plotted in the CIELAB color-space, either fall within the initial reproducible gamut (e.g. 18), or outside. The image 10 for example, has pixels that fall outside the initial gamut in the green 20, blue/violet 22, and red/orange 24 areas of the CIELAB color-space, all of which cannot be reproduced accurately by CMYK process colorants (corresponding to the initial color gamut) alone.

Figure 5:
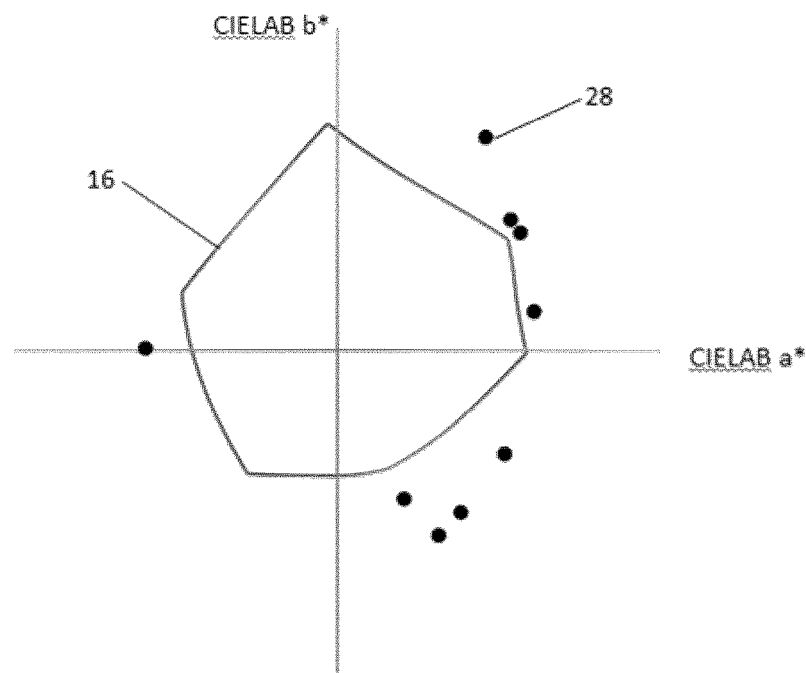
FIG. 5 is a 2D CIELAB color space showing CMYK gamut and primary colorants.
Figure 6:
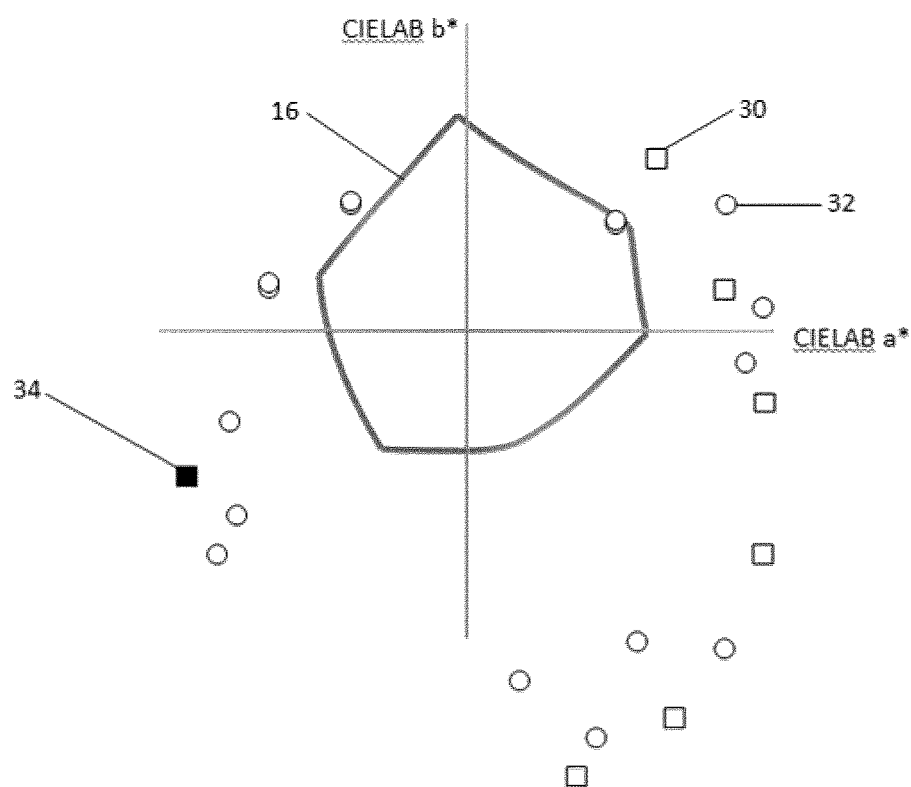
FIG. 6 is a 2D CIELAB color space showing CMYK gamut, primary, and secondary colorants.

With reference to FIGS. 5 and 6, in an illustrative example, given a maximum number of N colorants 28 to be considered for inclusion in a press run (e.g. as defined by an input parameter or as defined by attributes of the target printing device), an optimal selection of m free colorants 32 can be made (where m=N−n relates to the available colorant channels on press given that a fixed set of n process colorants 30 have already been specified). For example, if a CMYK process set is to be utilized (n=4) on a 7-color press, up to (m=3) additional free colorants may be selected in order to extend the reproducible gamut for that specific job. In an alternative configuration, a CMY process set (n=3) on a 5-color press will result in the possibility of up to (m=2) additional free colorants to be selected for gamut extension. In other examples, the fixed set of colorants are not limited to CMY or CMYK, but may extend to a selected set as defined by an input received from a memory or via an input device. In some examples, the selected initial colorant set may be defined by information in a digital asset such as spot colors in a print job, etc.

In accordance with example embodiments described herein, the free colorants can be selected from a set of available colorants M based on the analysis of the pixels falling outside of the gamut as specified by the fixed colorant set 30. As an example, the pool M of available free colorants may be constructed from the Pantone PMS primary colorants or a sub-set thereof (i.e. Red 032, Warm Red, Rubine Red, Orange 021, Violet, Purple, Blue 072, Reflex Blue, Green), while the fixed colorant set may be specified as CMYK. The set of fixed colorants (n) or free colorants(M) are not limited to these examples, but could extend to other colorant sets (e.g. Toyo, HKS).

Figure 8:
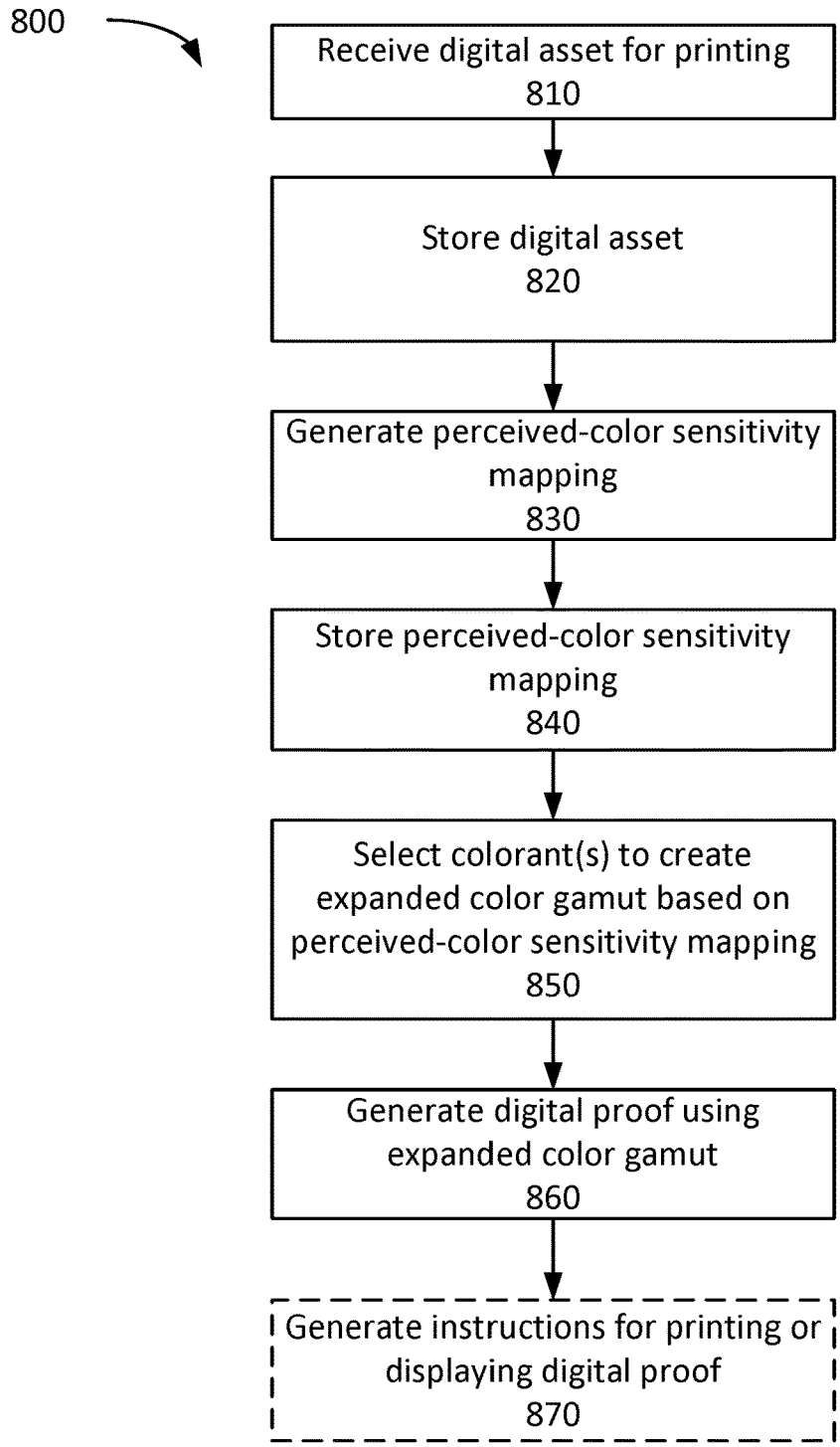
FIGS. 8, 9 and 10 are schematic flowchart showing aspects of example methods in accordance with example embodiments.

FIG. 8 shows a flowchart illustrating aspects of an example method for expanding an initial printing color gamut. In some example embodiments, the initial reproducible color gamut 16 can be based on an initial, standard, default, or currently configured set of colorants. In some examples, the initial gamut or colorants (and the colorants' corresponding gamuts) can be accessed or received by the processor(s) 1010, for example from a memory device 1020 or printing device 1060. In some examples, the initial color gamut or colorants may be based on an input from input device(s), or on information in the digital asset.

At 810, the processor(s) 1010 can be configured to receive a digital asset for printing or to prepare for printing. In some examples, the digital asset may be received by accessing a digital asset stored in a memory device 1020. In some examples, the digital asset may be received from an i/o interface 1030, for example, such as over a local connection (e.g. USB) or over a network connection. In some examples, the digital asset may be received from an input device (e.g. a camera).

In some examples, the digital asset can include one or more images, text documents, presentation slide, spreadsheets, drawings, or any other data which can represent something which can be printed. These digital assets may be in any standard or proprietary format which is suitable for being processed for printing, or can be converted into a format suitable for being processed for printing. In some examples, the digital asset can include print jobs, printing instructions, preferences, printing device information and the like.

The processor(s) may be configured to convert the digital asset into a format suitable for generating a perceived-color sensitivity map or otherwise suitable for printing. At 820, the processor(s) can be configured to have the digital asset (as converted and/or as originally received) stored at a first location in a memory device 1020.

As described herein or otherwise, in some embodiments, when a digital asset includes or is to be printed on multiple pages, the processor(s) may be configured to consider each page individually, as a whole or some variant thereof.

At 830, the processor(s) can be configured to generate a perceived-color sensitivity mapping. In some examples, the perceived-color sensitivity mapping can indicate the color-sensitivity or color importance of each pixel in the digital asset. For example, the perceived-color sensitivity mapping may include, for each pixel, a value for the color-contrast of the pixel's color relative to a color of at least a larger portion of the digital asset. In some examples, the values may represent relative the color-contrast of the each pixel's color relative to a color of a proximate portion of the digital asset.

Figure 10:
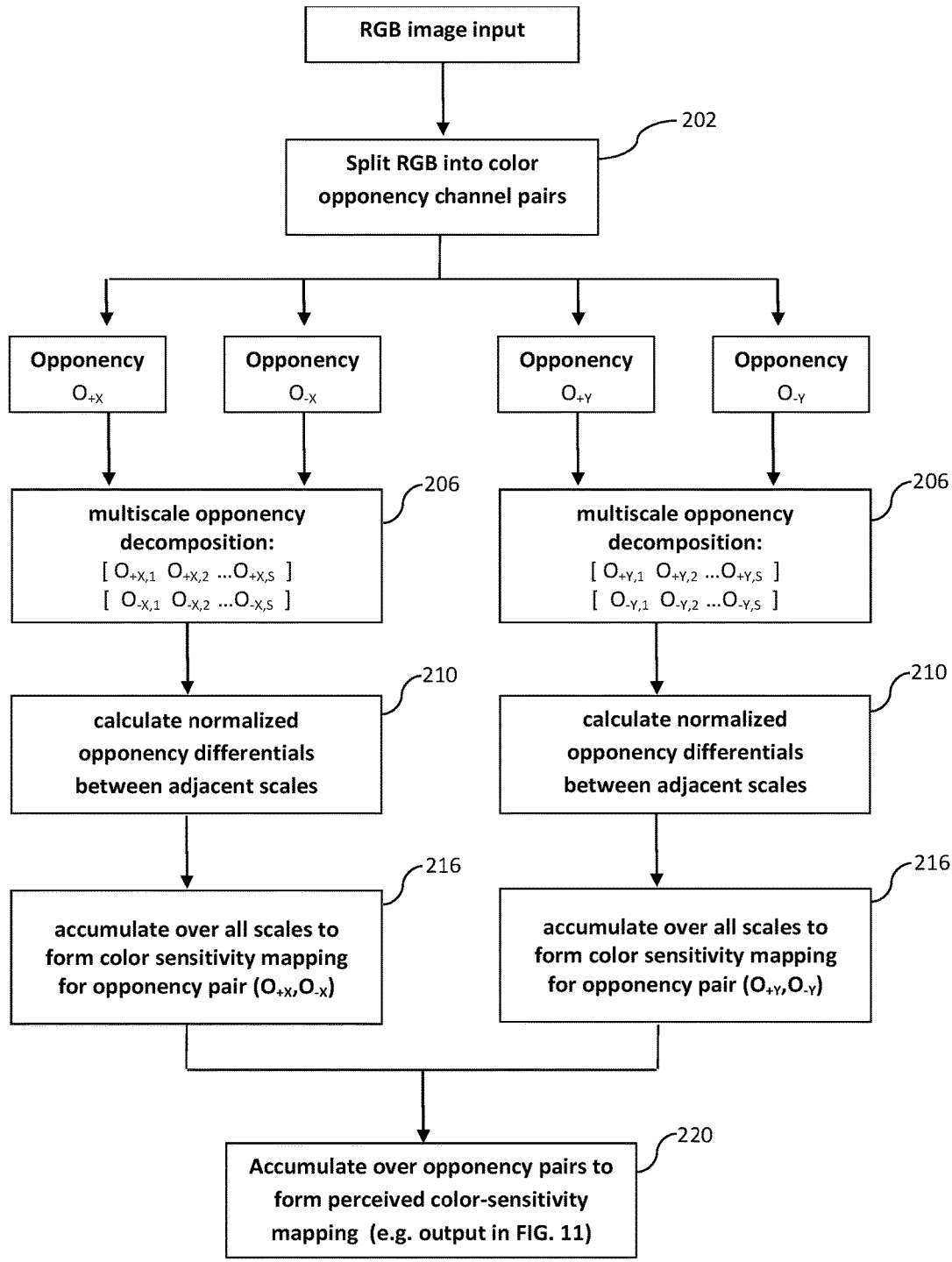

In some embodiments, the perceived-color sensitivity mapping may be generated as outlined in the example method described with respect to the flowchart in FIG. 10.

At 840, the processor(s) can be configured to store the perceived-color sensitivity mapping in a second location in a memory device 1020.

At 850, the processor(s) can be configured to select colorants for expanding the color gamut based on the perceived-color sensitivity mapping. In some embodiments, the colorants can be selected based on a weighting of the pixels falling outside the initial color gamut with the perceived-color sensitivity value for those pixels.

In some embodiments, selecting the colorants can include grouping the pixels outside the initial color gamut into free colorant groups based on a function of the color of each pixel and optionally on its value in the perceived-color sensitivity mapping. Each free colorant group can be ranked based on an average perceived-color sensitivity mapping value for the pixels in the corresponding free colorant group.

Based on available color channels or a cost analysis, the number of colorants are selected from the top ranked free colorants. These selected colorants may increase the initial color gamut to an expanded color gamut. In some examples, the expanded color gamut can represent a selection which provides an optimal or improved quality based on the perceived-color sensitivities specific to the digital asset and where applicable, based on available colorants and/or printing device capabilities.

At 860, the processor(s) can be configured to generate a digital proof using the expanded color gamut. This can, in some examples, include generating a print job or an image based on the initial and selected colorants. In some embodiments, the proof may represent what the digital asset should look like when printed with the final colorant set (initial and selected colorants).

In some embodiments, the processor(s) can be configured to generate the digital proof by converting or (re)mapping the digital asset based on the expanded color gamut/final colorant set. In some embodiments, the digital proof may be stored at a third location in a memory device.

At 870, the digital proof may be displayed on a display for previewing, and/or may be sent to printing devices with instructions for printing. In some examples, based on instructions and/or data from the device 1001 or system 1000, one or more printing devices may generate a physical proof or printout of the digital asset based on the revised color gamut. In some examples, the physical (hard copy) proof printed by the printing device(s) may be a representative physical version of the digital asset (e.g. a physical simulation) that may be achieved on a destination printing device (e.g. printing press).

In other examples, a device 1001 or system 1000 may send instructions and/or data for printing the digital asset based on the revised color gamut directly to a final printing device (e.g. printing press).

In some embodiments, the device 1001 or system 1000 may create a print job or other format of the converted digital asset and printing metadata/details.

Figure 9:
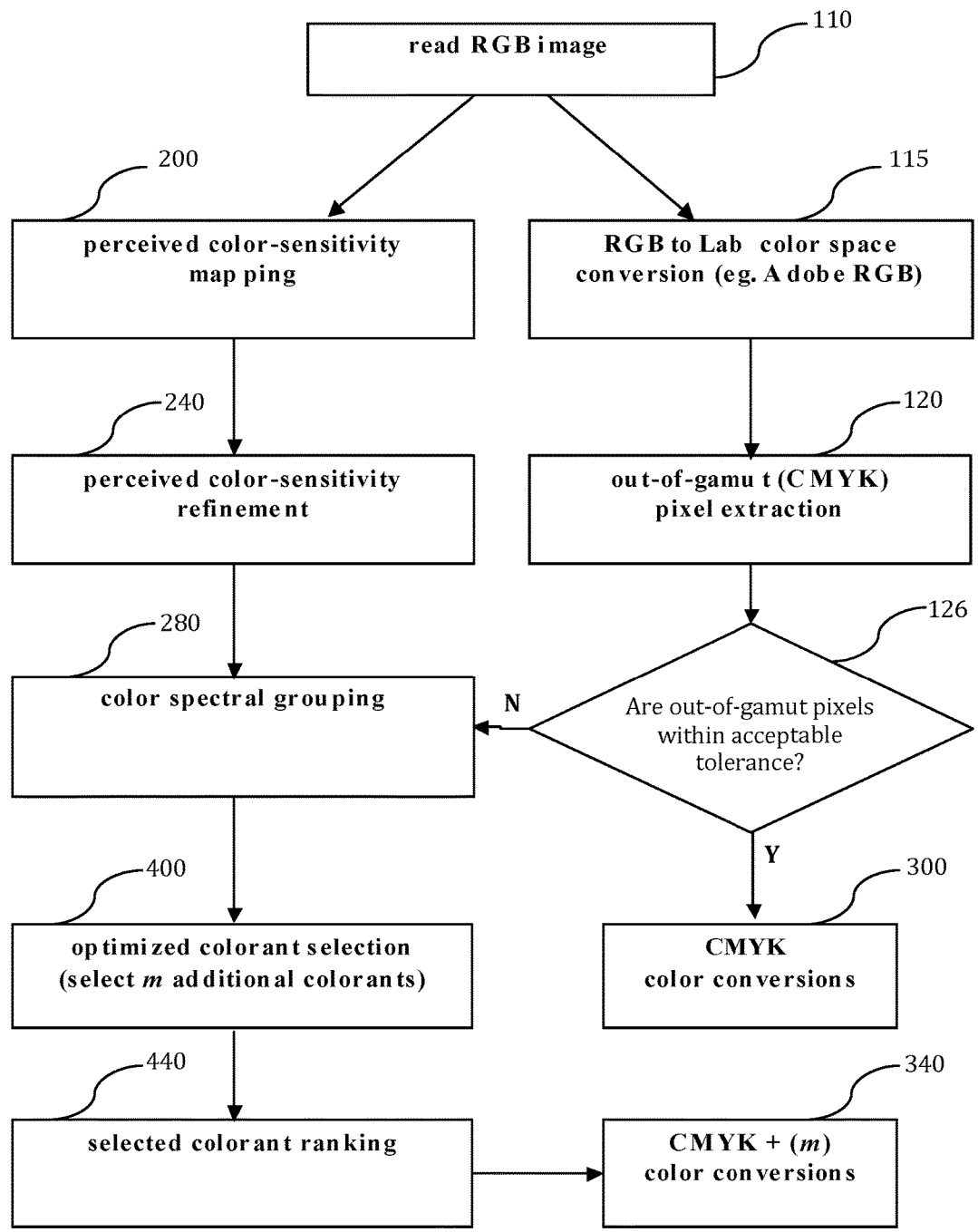

Additional example aspects of the methods illustrated by FIG. 8 can be found in the discussions of FIGS. 9, 10 and as otherwise described herein.

FIG. 9 shows a flowchart illustrating aspects of an example method for expanding an initial printing color gamut. It should be understood that a subset or select aspects of the examples described with respect to FIG. 9 can be incorporated into the high level discussion with respect to FIG. 8.

Beginning with a digital asset such as an RGB image asset 110, which can represent an intended job design to be converted into a set of colorant channels for printing on press, the system and methods herein can be configured to determine a selection of (m) free colorants 30 to be used in conjunction with fixed colorants 34 (e.g. CMYK) to achieve an extended color gamut in the printed result. While FIG. 9 shows an example where an RGB image has been received as a digital asset to be processed for printing. In other examples, any other format or image or other digital asset can be received. In some examples, the digital asset may be converted, (re)mapped or otherwise transformed into a format suitable for processing. RGB is one such format; however, in other examples, CMYK+, LAB (CIELabcolor), Adobe RGB or other color spaces could be used.

As illustrated for example, in FIG. 9, the digital asset can be processed through two pipelines: one that quantifies perceived color-sensitivity 200 (color importance) for each pixel in the image, and one that analyses in- and out-of-gamut pixels 120,126 (based on the fixed or initial colorant set). In various embodiments, the processor(s) may be configured to perform these two pipelines in parallel or in series.

The processor(s) can be configured to analyze the digital asset to establish whether there is a need for additional colorants. At 115, the digital asset, in RGB or other format can be converted into a LAB or other color space for identifying in- and out-of-gamut pixels at 120, 126 based on an initial printing color gamut corresponding to an initial or fixed colorant set.

After converting 115 the digital asset into a color space suitable for out-of-gamut analysis, the processor(s) can be configured, at 120, to separate the pixels from the digital asset that cannot be reproduced appropriately with the initial set of colorants 34 alone.

At 126, the processor(s) can be configured to determine whether the out-of-gamut pixels are within acceptable tolerances. These tolerances can, in some examples, be defined by parameters associated with the digital asset, parameters associated with the system 1000, device 1001, printing device 1060, and/or parameters defined by a program (software application, driver, operating system, etc.), device or user-defined setting.

When the digital asset can be adequately reproducible with the fixed colorants only (e.g. all or a certain amount of out-of-gamut pixels fall within acceptable tolerances), the generation of a digital proof 850, 300 will not involve any additional (m) colorants or expanded gamut. In some examples, the digital asset may already be in a form suitable for printing, so no additional converting or (re)mapping of the digital asset may be required.

At 200, 830 the processor(s) can be configured to generate a perceived-color sensitivity mapping or otherwise quantify perceived color-sensitivity (color importance) for each pixel in the image. In contrast to manual, subjective, and potentially inaccurate color selection performed by a human technician, in some instances, this mapping performed by the systems, devices and methods described here, may create a consistent, reproducible and measurable color importance for each pixel in the image.

At 240, the processor(s) can be configured to provide for the refinement of the perceived-color sensitivity mapping. The processor(s) can be configured to display a visual image of the mapping on a display. Through interactions with the displayed image or otherwise, the processor(s) can be configured to receive input(s) identifying a portion of the perceived-color sensitivity mapping (or the digital asset) as important. These input(s) to refine or re-target the color importance can be received via input device(s) such as an input selecting a portion of the displayed image, the selection of one or more pixels, and/or the selection of one or more spot colors.

The processor(s) can be configured to increase the perceived-sensitivity values for the pixels corresponding to the input(s), or otherwise adjust the values for any number of pixels to increase the relative values of the pixels corresponding to the input(s). If adjusted, the revised perceived-sensitivity mapping is applied to subsequent steps.

At 280, color pixels falling outside of the initial reproducible gamut can then be grouped 280 according to both color spectral properties, and color importance. These groups are can be used in the optimal selection of (m) free colorants. At 400, the free colorants can be ranked 440 according to how each colorant is expected to maximize visual impact in the printed result. At 340, the processor(s) can be configured to apply the selected colorant specifications to a color conversion process 340 to perform color separations (e.g. (CMYK+m) and generate the necessary plate specifications to be used on press.

In addition to formulating the plates to be used in the print process, the selection of colorants can, in some embodiments, be used to generate hard and soft proofs to visualize the expected output on press.

In some embodiments, colorant selection may be optimized toward hitting any spot colors that are embedded in a digital asset (e.g. an image/job file). In this case, the free colorants can be pre-filtered such that the embedded spots are 'hit' or reproduced to within a desired tolerance. The colorants from the free set deemed necessary to hit such tolerances, can then be promoted to the fixed/initial set, and optimization over the imagery may then proceed as described herein (i.e. given the new/reduced number of free colorants remaining).

In some examples, colorant selection may be entirely based on the optimization of colorants to meet embedded spot color job specifications alone, without consideration of the perceived-color sensitivities.

FIG. 10 shows an example process for perceived color-sensitivity mapping 200. At 202, the processor(s) can be configured to split, project, map or otherwise convert digital asset or a suitable conversion (e.g. a 3-channel RGB image input as illustrated in FIG. 10) onto at least one pair of color opponency axes. While the input in FIG. 10 is ab RGB image, in some embodiments, other input formats may be possible.

Color opponency pairs can, in some embodiments, be formed from two polar opposites in terms of hue. For example, red and green may form a color opponency pair. Likewise, blue and yellow form another color opponency pair. In another example, black and white may be another color opponency pair. In FIG. 10, the digital asset is split onto 2 pairs of color opponency axes (+X and −X, and +Y and −Y); however, in other example embodiments, 1 pair, 3 pairs or any other suitable number of pairs may be used.

In some embodiments, the processor(s) can be configured to create a color opponent image for each axes. A simple projection can re-cast each (r,g,b) pixel value onto each color opponent, to form a 4-tuple representation (r,g,b,y), where (r,g) each represent the pixel color value projected onto both the R and G opponency axes (more generically denoted as $O_{+X}$ and $O_{-X}$) respectively. For example, a decoupling of R and G opponencies can be defined by:

$$R = r - \frac{b+g}{2}$$

$$G = g - \frac{b+r}{2}$$

These equations represent a projection of the r,g,b colorspace onto these two opponency axes. Similarly, (b,y) each represent the pixel color value projected onto the B and Y opponency axes (more generically denoted as $O_{+Y}$ and $O_{-Y}$).

In this example, 4 single channel images can be created: each a grayscale image, relating to a pixel distribution of a single color opponent. The example embodiment illustrated in FIG. 10 and by this example is based on these standard R-G and B-Y opponencies. Opponency axes may be taken to create any polar opposites (in terms of hue), and in other examples, may not be limited to these standard opponencies.

In some embodiments, at 206, the processor(s) can be configured to create a multi-scale decomposition for each color opponent image. This decomposition may be performed, for example, using Gaussian pyramids, wavelet decompositions, or a series of decimated versions of the original color opponent image (at increasing factors 2,4,8, 16, etc.).

The processor(s) can be configured to create decompositions over a number of scales (S). For example, S=4, there would be 4 scaled versions of the original image, each of pixel dimension $N/2^S \times M/2^S$ corresponding to the corresponding scale value S. For instance, if S=1, the decomposition of $O_{+X,S-1}$ may represent the original color opponent image, and $O_{+X,S}$ may represent an approximation of the original that is half the size (in terms of pixel x and y dimension). The $O_{+X,S}$ notation in FIG. 10 represents a scaled down (decimated) version of the original opponency image $O_{+X}$. For example, for S=1, the original opponency image has been decimated once; and for S=2, the original opponency image has been decimated twice.

In another example, a Gaussian pyramid may be alternatively used to perform the decomposition based on the following equations:

$$G_0(x,y) = I(x,y), \text{ for level, } l=0$$

$$G_l(x, y) = \sum_{m=-2}^{2} \sum_{n=-2}^{2} w(m, n) G_{l-1}(2x + m, 2y + n),$$

otherwise
where l=S (decomposition level);
x,y is a location of a pixel in I(x,y) and $G_l(x,y)$;
m,n is the window (pixels around x,y used in the calculation); and
w(m,n) is a 2D Gaussian filter.

In another example, a similar decomposition may be achieved using a discrete wavelet transform DWT (e.g. using Haar wavelet or other), where each $O_{+X,S}$ may be attained from the 'approximation' component of the DWT transform, for a given scale S. S=1 would represent a single level decomposition, S=2 two levels of decomposition, etc. The nth level decomposition may be achieved by performing the DWT on the 'approximation' from the (n−1)th level decomposition.

At 210, the processor(s) can be configured to construct or otherwise determine a series of opponency-pair differentials $(OD_{X,S})$ between adjacent scales according to the following equation:

$$OD_{X,S} = \text{norm}(|O_{+X,S} - O_{-X,S+1}| + |O_{-X,S} - O_{+X,S+1}|)$$

where norm( ) is a normalization operation that maps the values to a range between 0 and 1. Norm( ), refers to a scaling operation that takes the result of the merged opponency images. Other forms of normalization may also be used such as: Gaussian normalization (with shift and clipping onto 0-1); or non-maximal suppression.

In some embodiments, the scaling and differential determination can be repeated over each of a number of scales. For example, in some examples, this can be repeated for S=1, 2, 3 and 4. However, a different number of scales, or different combinations of scales may be used.

At 216, the processor(s) can be configured to accumulate the resulting differentials to form a single mapping for a given opponency-pair which can, in some examples, indicate pixels that exhibit strong color contrast (values closer to 1) for a given opponency-pair, with respect to their surrounding pixels (at various scales of proximity) in the digital asset.

In some embodiments, the mappings from different scales may be compared and/or accumulated by upscaling, reconstructing or otherwise resizing scaled mappings so that they are compared and/or accumulated at the same resolution. For example, for DWT, an inverse discrete wavelet transform (IDWT) can be performed on an S+1 scale opponent for comparison/accumulation with an S scale opponent. In other words, an S scale version of an S+1 decomposition can be rebuilt for comparison. However, the S scale opponent image may include higher frequency information while the rebuilt S+1 image may not (as it is constructed from the approximation component of the S+1 level DWT).

For example, in the $OD_{X,S}$ equation above, each O term may have been reconstructed such that the comparisons are made with images at the same resolution. e.g. for DWT, $O_{+X,S}$ would be compared with $IDWT(O_{-X,S+1})$, etc. In another example, for Gaussian pyramid implementations, resize operations may be applied.

Figure 11:
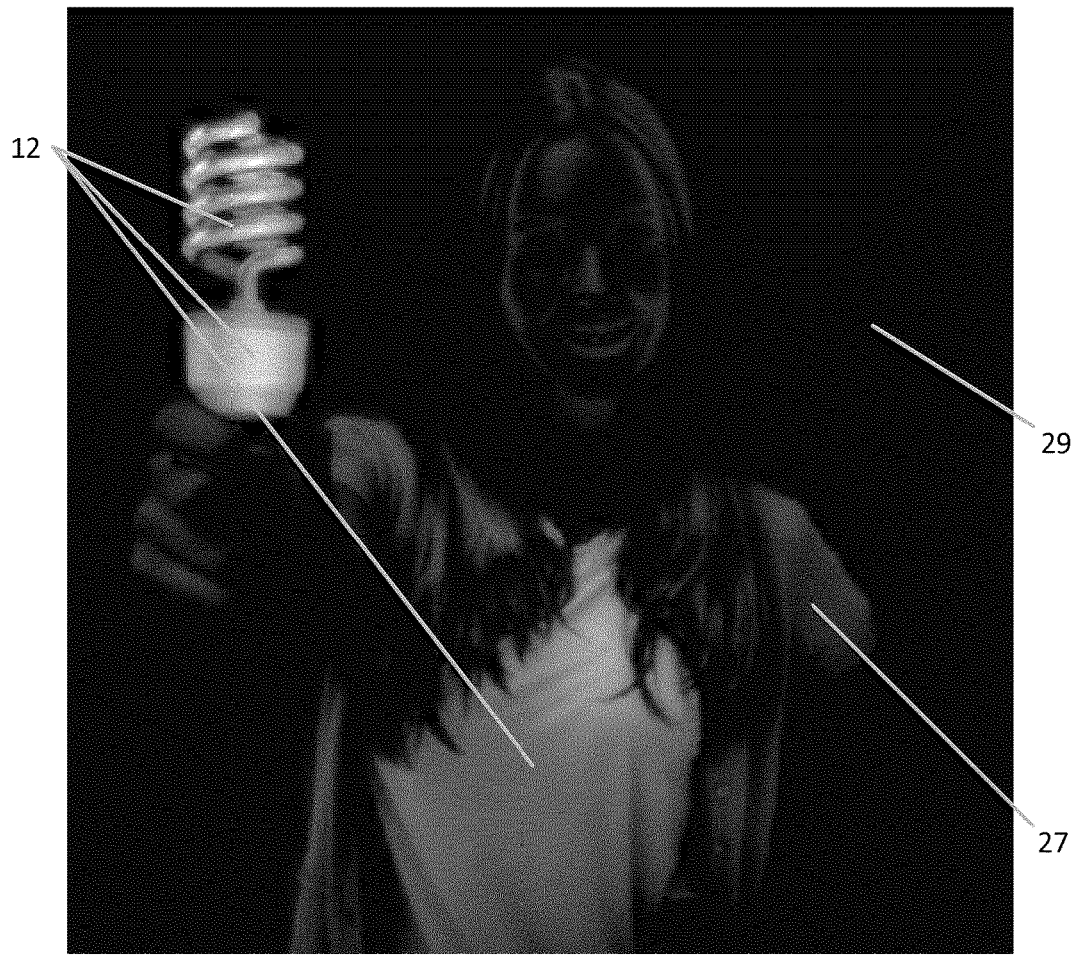
FIG. 11 is an example perceived-color sensitivity map (PCSM) for the original RGB image shown in FIG. 2.

The same process is applied to the any additional opponency-pair (e.g. $O_{+Y}$, $O_{-Y}$), and the resulting maps are merged, at 220, to form a perceived-color sensitivity map (shown, for example, in FIG. 11 which corresponds to the original image in FIG. 1). The values can ranging from strong 25 (e.g. values close to 1) down to weak 29 (e.g. values closer to 0), and may indicate for each pixel, whether that pixel exhibits strong, medium 27, or weak color-contrast (perceived sensitivity to that pixel's color) in the context of the broader image. This automatically-generated mapping may, in some instances, act as an indicator of each pixel's color importance in the image.

In 3D applications, the differentials, accumulations, and other comparisons can be expanded to apply to multiple dimensions.

Figure 12:
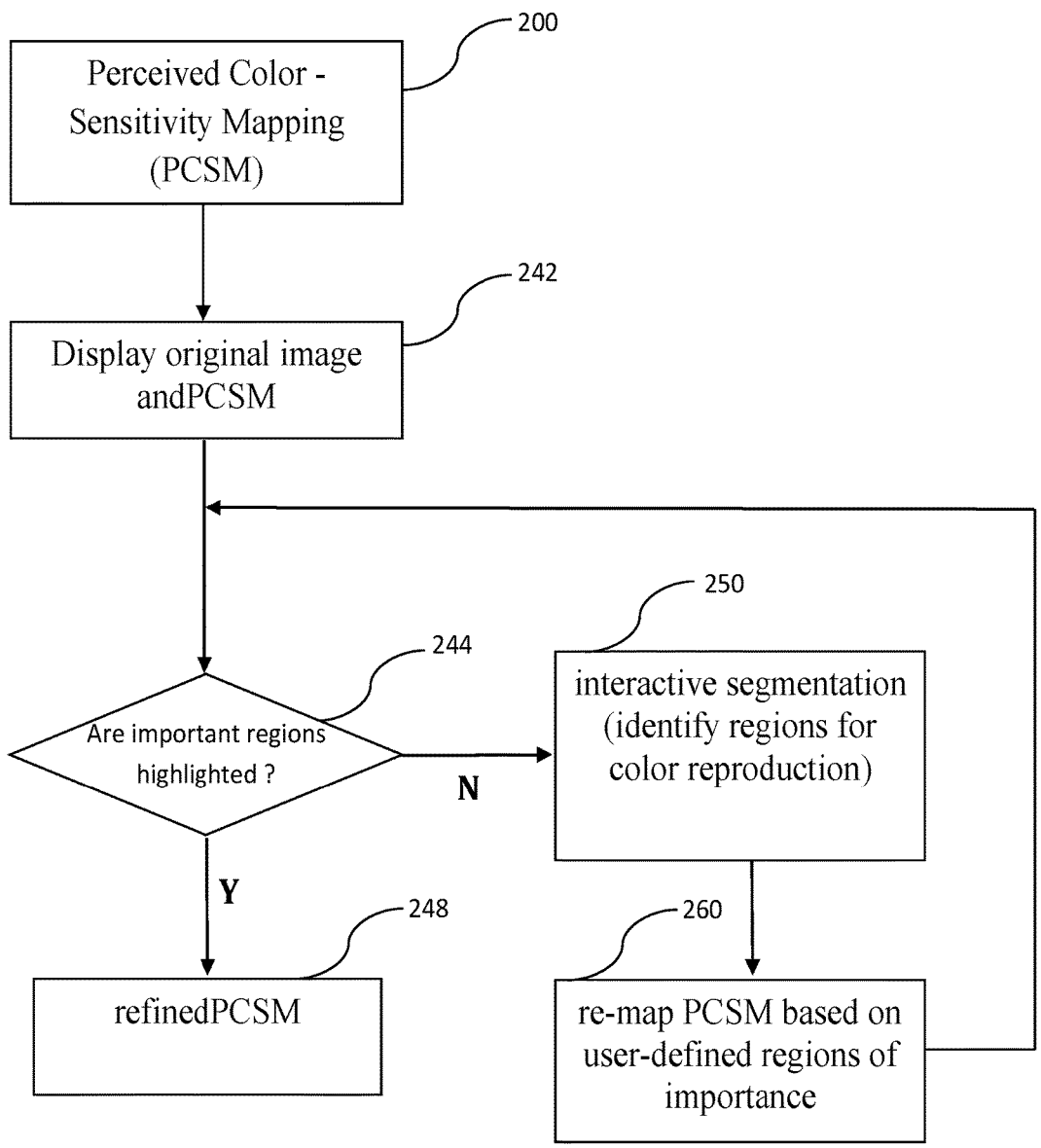
FIG. 12 is a schematic flowchart showing aspects of example methods in accordance with example embodiments.

An option to refine the perceived color-sensitivity mapping (PCSM) 240, through user-interaction, is illustrated by the example in FIG. 12. In this process, PCSM can be displayed to the user 242 to indicate areas that were automatically considered to be important in terms of color in the image. If a user decides further modification of this mapping is warranted 244, they device(s) may be configured, at 250, to allow for interactive segmentation/identification of the area(s) of the image that may be important regions for improving color fidelity via one or more input devices. For example, an input may be received highlighting (e.g. a click or click-and-drag) a single pixel location (or multiple pixel locations) in the original image that correspond to the location of important color regions. The segmentation process (seeded by the user selected pixels) can be configured to automatically extract an associated region and adapt or adjust the perceived color-sensitivity mapping 260 to reflect the user's desired areas of importance. A number of alternative segmentation approaches can be utilized in this step. For example, a simple bounding box, as defined by inputs received via an input device, may be used to indicate an important area, or an energy-minimizing segmentation technique (e.g. grabcut, graphcut, random walker, or deformable snakes). Such segmentation could be based on original color content, some transformed version of the original image (e.g. edge image), the automatically generated PCSM or some combination thereof. The process of refinement can be iterated until the an input is received 244 to confirm that the refined PCSM is suitable 248 for consideration in colorant selection.

Figure 7:
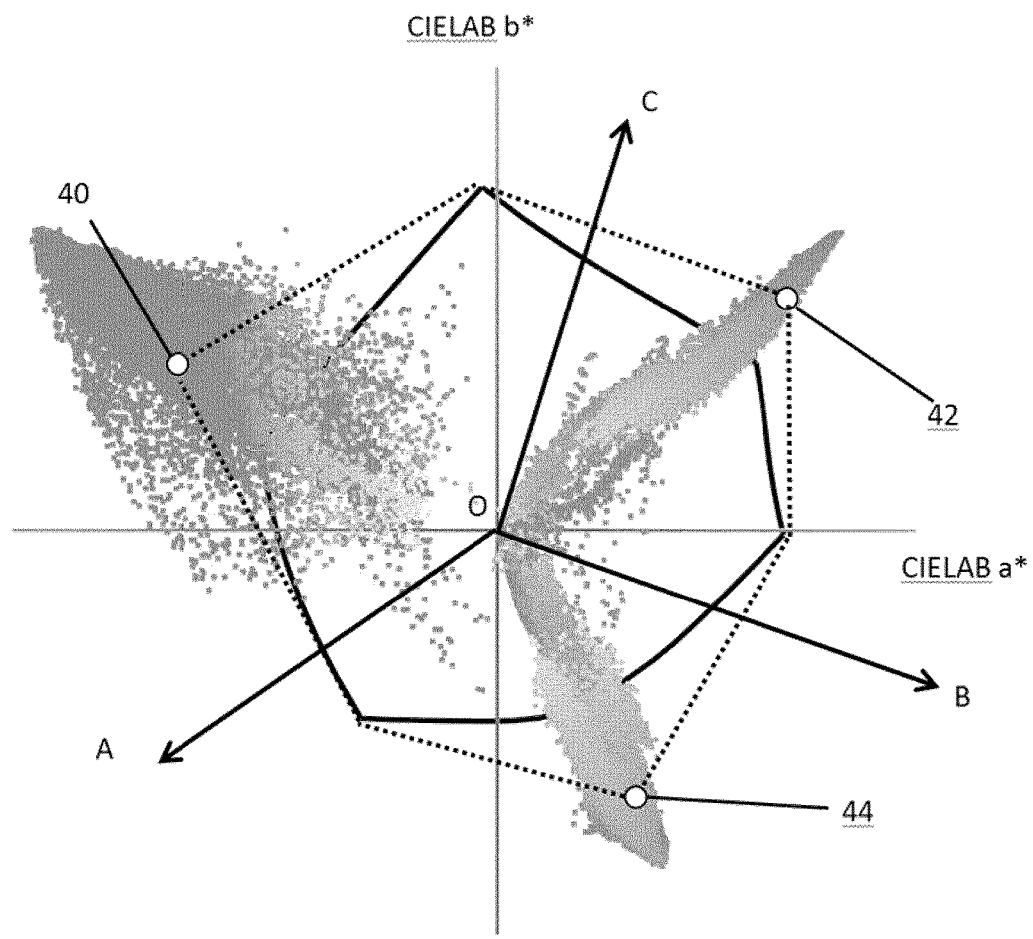
FIG. 7 is a 2D CIELAB color space showing CMYK gamut, partitioned groups of out-of-gamut pixels, and color representatives determined by color spectral grouping.

Color spectral grouping 280 can then performed by partitioning of the set of out-of-gamut pixels P projected on the CIELAB color space into k=m groups of out-of-gamut pixels. After partitioning, each group of pixels can be associated with one possible free colorant from the possible set M. This partitioning may be considered as a partitioning into m sectors in the CIELAB colorspace (FIG. 7). Thus for m=3 additional free colorants, the out-of-gamut pixels are segmented into 3 sectors (AOC, AOB and COB). The three groupings can be based on minimization of a cost function that considers both the color spectral properties (location in CIELABspace) of the out-of-gamut pixels and the color importance (as indicated by the PCSM) of each pixel. Each group of pixels can be represented by a weighted mean of all (Lab) pixel values within the group (weighed by corresponding PCSM values). Each representative can be matched to its most similar candidate free colorant. Similarity in the current example is based on a cosine distance metric, though a person skilled in the art would understand that, in other embodiments, other distance metrics may be used (e.g. Euclidean, Manhattan, Pearson Correlation Coefficient, etc.). The similarity measure could also be based on colorimetric ($\Delta E$) or chromatic/hue error that would result for each pixel in a group (due to gamut compression), given a candidate colorant proximal to the group chosen.

At 440, the selected colorants (unique), are ranked in terms of the color impact (increase in perceived color fidelity) they are each expected to individually contribute to the printed reproduction. This ranking can be based on the average PCSM value calculated for each group of pixels that has been associated with a selected colorant. The ranking can be used to generate soft and hard proofs that visualize the impact of additional colorants, taken either individually, or as a combination with the fixed process set (CMYK). The final set of (m) colorants is finally passed on for color conversion 340 (separation into channels), which can be the basis for plate generation and job file definition to be used on press when printed.

In some embodiments, the systems, methods and devices described herein may be configured to In some embodiments, systems and methods described herein may allow for analysis that is automated, objective, and job specific (i.e. optimization can adapt to each job), which in some instances may reduce the need for press operators to subjectively 'paint on press' to achieve quality reproductions, or to retain a fixed set of hi-fi colorants that globally extend the gamut, but does not have the ability to adapt and fill regions of the gamut that the job may benefit from.

In some embodiments, systems and methods described herein may be used in conjunction with any type of press (offset, web/roll, digital, flexo, or any printing system with multicolor option), printing device, 3D printer, additive manufacturing device, and the like.

In some embodiments, systems and methods described herein may be used in conjunction with any set of fixed or free colorants as long as the Lab/spectral values are known for each candidate colorant considered.

In some embodiments, the systems, methods and devices described herein may be configured to generate a score for rating the perceived improvement of a digital asset or a portion of a digital asset to be printed using the initial color gamut versus an expanded color gamut. This score may be used to select colorants for multi-page assets, to identify a subset of a set of digital assets which would benefit most from additional colorants, etc. Some illustrative examples are described below.

In some embodiments, the score calculation may be based on a color difference between the original digital asset based on the initial color gamut and/or the original digital asset, and the digital asset based on the expanded color gamut. For example, the color difference score may be based on one or more International Commission on Illumination (CIE) equations. In some embodiments, the color differences may be based on color comparisons on a pixel by pixel basis. In some examples, the pixel color differences may be summed, averaged, or otherwise combined to create a score across the digital asset or a portion of the digital asset.

In one example embodiment, a score may be based on:

$$\Delta E(p, r) - \frac{\Delta E(q, r)}{\Delta E(p, r)}$$

where r=reference image (e.g. adobeRGB);
p=process image (e.g. CMYK);
q=extended gamut (e.g. CMYK+m inks).

In this example equation, the score may be representative of the percentage of color error reduced using the extended (selected) gamut colorants versus the process set. If there is no improvement in q, then score=0. If q approaches r, then score=1.

In other examples, different equations or comparisons may be made to calculate the score.

In some embodiments, the score can be weighted at each pixel by the perceived-color sensitivity mapping. For example, pixels having a lower perceived-color sensitivity value may be weighted less or may not be considered.

In some embodiments, systems and methods described herein may optimize the selection of free colorants over a digital asset in the form of a set of images, spanning multiple pages within a job on press (e.g. travel or fashion brochure). In some examples, they may attempt to select colorants on a per page basis. In some examples, they may be configured to select colorants that yield an optimal color reproduction for the majority of pages to be considered in the job.

If a job has 10 pages, and a particular colorant selection is found which optimizes over 8 of those pages, this set may, in some embodiments, be considered better on a perceived color basis versus a color selection that is determined be considering all pages together.

The consideration here is that the impact is generally experienced on a page by page basis and thus can be optimized as such, where conversely, it may not be practical to switch colorants over the entire run for the multi-page job. It is also considered that user modification of the PCSM can be conducted on a page by page (image by image) basis in order to adapt color importance for the optimal colorant selection algorithm.

In some embodiments, systems and methods described herein may be used to select the best subset of colorants from within m constrained sectors of the desired gamut. For example, for m=3, the systems and/or methods could be constrained to select the best blue plus the best red and best green to be used in a seven color process.

In some embodiments, the methods described herein could be used as a tool to rank images or pages based on the best appearance given that colorants are added. The ranking process follows from the ranking of individual colorants for the improvement (gamut expansion) that results from their inclusion. In this embodiment, the colorants are pre-selected, and the set of images may be ranked based on the relative improvement (e.g. the scores described herein) (versus the fidelity achievable using only the fixed colorant set).

In some embodiments, the methods described herein could be used to automatically extract a palette of spot colors that can adequately be reproduced (within a desired tolerance), for a given image or set of candidate images that are under consideration during the design phase (job construction). In this sense, repositories of image content (public or proprietary) can be analyzed to extract a palette that can be used when adding vectorized content (e.g. logos, text, and other vector art). Alternatively, a repository could be searched on the basis of which images are most suitable and can benefit from gamut extension given the choice of a particular set of colorants to be used in the print process.

In another example embodiment, embedded spot colors that might be present in the image can be targeted as a priority over improving the imagery alone. In this case, colorants can be either selected to optimize spot color reproduction alone, or together with imagery. In the former, the minimal set of colorants can be selected that can hit all defined spot colors (embedded) to within desired/acceptable tolerances (usually defined as a desired deltaE: using any of the deltaE standards—e.g. 95, 2000, etc). Up to the number of free colorants available may be used to achieve a 'best' match over all spots in the file.

In the latter, the minimal set of colorants required to meet spot color tolerances is first established. If this is less than the number of free colorants, then these colorants are added to the fixed set, and the remaining number of available channels (free colorants) can be used to select colorants to further improve over the imagery (as outlined in the primary method of the patent).

In some embodiments, the methods, systems and devices described herein may be applied to 3D printing, additive manufacturing, or other similar technologies. For example, a 3D printer may include base or standard initial colorants, inks or colored materials having an initial color gamut, with potential extra colorants, inks or colored materials which could be used to adjust a color gamut or otherwise improve a digital asset's color reproduction. For example, embodiments described herein may be applied to Projet® 660 3D printer.

The methods disclosed here or part(s) thereof may be computer-implemented. Accordingly, various aspects of the present disclosure may be embodied as an apparatus, method or computer program product. Accordingly, aspects of the present disclosure may take the form of an entirely hardware embodiment, an entirely software embodiment or an embodiment combining software and hardware aspects. For example, such computer program product may comprise computer readable program code (e.g., instructions) for execution by a suitable computer (e.g., processor). Such computer program product may be stored on non-transitory or other suitable computer-readable medium. The computer program product may, for example, be executed by a computer, processor or other suitable logic circuit to cause the execution of one or more methods disclosed herein in entirety or in part.

What is claimed is:

1. A method for expanding an initial printing color gamut, the method comprising:
    receiving, at at least one processor, a digital asset to be prepared for printing;
    storing the digital asset in a first memory location;
    generating, with the at least one processor, a perceived-color sensitivity mapping for the digital asset;
    storing the perceived-color sensitivity mapping in a second memory location;
    based on the perceived-color sensitivity mapping for the pixels outside the initial printing color gamut, selecting one or more free colorants to create an expanded color gamut;
    converting, the digital asset into a digital proof using the expanded color gamut; and
    generating instructions for printing or displaying the digital proof.

2. The method of claim 1, wherein the perceived-color sensitivity mapping indicates, for each pixel in the digital asset, a value for a color-contrast of a color of the pixel relative to a color of at least a larger portion of the digital asset.

3. The method of claim 1, comprising:
    displaying a visual image of the perceived-color sensitivity mapping;
    receiving an input identifying a portion of the perceived-color sensitivity mapping as important; and
    generating a revised perceived-color sensitivity mapping for the digital asset by adjusting values based on the importance of the identified portion of the perceived-color sensitivity mapping;
    wherein selecting the one or more free colorants to create the expanded color gamut is based on the revised perceived-color sensitivity mapping.

4. The method of claim 1, wherein generating the perceived-color sensitivity mapping for the digital asset comprises:
    for each pixel in the digital asset, projecting a color of the pixel onto at least one pair of color opponency axes to create a color opponent image for each axis;
    for each pair of color opponent images, determining an opponency-pair differential between adjacent scales of the images; and
    generating the perceived-color sensitivity mapping from the opponency-pair differentials.

5. The method of claim 4, wherein determining the opponency-pair differential for each pair of color opponent images comprises:
    generating a multi-scale decomposition for each color opponent image; and
    determining the opponency-pair differentials for each scaled image generated by the multi-scale decomposition; and
    wherein generating the perceived-color sensitivity mapping comprises accumulating the opponency-pair differentials for each scale in the multi-scale decomposition.

6. The method of claim 4, wherein the at least one pair of color opponency axes are selected from the group comprising: red-green axes, blue-yellow axes, and black-white axes.

7. The method of claim 1, comprising: before generating the perceived-color sensitivity mapping for the digital asset:
    identifying the pixels outside the initial printing color gamut;
    determining whether the pixels outside the initial printing color gamut are within a defined tolerance; and
    when the pixels outside the initial printing color gamut are not within the defined tolerance, generating, the perceived-color sensitivity mapping for the digital asset.

8. The method of claim 1, wherein selecting the one or more free colorants to create the expanded color gamut comprises:
    grouping the pixels outside the initial printing color gamut into free colorant groups based on a function of the color of each pixel and its value in the perceived-color sensitivity mapping; and
    determining a rank for each free colorant group based on an average perceived-color sensitivity mapping value for the pixels in the corresponding free colorant group.

9. The method of claim 1, wherein when the digital asset is to be printed includes multiple pages, the one or more free colorants are selected on a page by page basis.

10. The method of claim 1, wherein when the digital asset to be printed includes multiple pages, the one or more free colorants are selected to optimally apply to all of the pages based on the perceived-color sensitivity mappings.

11. The method of claim 10, comprising: ranking the pages based on an appearance score for each page, each appearance score based on the expanded color gamut and the perceived-color sensitivity mappings corresponding to each page.

12. The method of claim 11, wherein generating instructions for printing or displaying the digital proof comprises: generating instructions for printing or displaying a subset of the pages having the highest appearance scores.

13. The method of claim 1, wherein when the digital asset identifies at least one spot color, selecting the one or more free colorants to create the expanded color gamut includes selecting colorants such that the at least one spot color can be reproduced within a defined tolerance.

14. The method of claim 1, comprising: receiving an input identifying a color or pixel in the digital asset; wherein selecting the one or more free colorants to create the expanded color gamut includes selecting colorants such that the identified color or the color corresponding to the identified pixel can be reproduced within a defined tolerance.

15. A device comprising:
    at least one memory; and
    at least one processor configured to perform the method of claim 1.

16. The device of claim 15, wherein the device is configured to generate signals for instructing a printing device or system.

* * * * *